United States Patent
Tung et al.

(10) Patent No.: US 8,009,920 B2
(45) Date of Patent: Aug. 30, 2011

(54) DATA RECOVERY APPARATUS AND METHOD

(75) Inventors: Hsu-Jung Tung, Kaohsiung (TW); Tzuo-Bo Lin, Taipei (TW)

(73) Assignee: RealTek Semiconductor Corp., Hsinchu (TW)

( * ) Notice: Subject to any disclaimer, the term of this patent is extended or adjusted under 35 U.S.C. 154(b) by 970 days.

(21) Appl. No.: 11/979,478

(22) Filed: Nov. 2, 2007

(65) Prior Publication Data

US 2008/0107167 A1 May 8, 2008

(30) Foreign Application Priority Data

Nov. 3, 2006 (TW) .............................. 95140854 A

(51) Int. Cl.
*G06K 9/62* (2006.01)
(52) U.S. Cl. ...................................................... 382/228
(58) Field of Classification Search .................. 333/18, 333/28 R, 139; 348/E7.052; 375/229; 382/228; 381/103; 386/269; 708/323
See application file for complete search history.

(56) References Cited

U.S. PATENT DOCUMENTS

| | | | | |
|---|---|---|---|---|
| 5,257,110 A | * | 10/1993 | Ohashi | 386/269 |
| 5,483,292 A | * | 1/1996 | Ko | 348/537 |
| 7,853,978 B2 | * | 12/2010 | Endres et al. | 725/74 |

* cited by examiner

*Primary Examiner* — Gregory F Cunningham
(74) *Attorney, Agent, or Firm* — Rosenberg Klein & Lee

(57) ABSTRACT

A data recovery apparatus applied to a receiving device. The receiving device include an interface, an equalizer, a sampling unit, and an analyzing unit. The method of the present invention includes steps of the interface unit receiving an input signal, and the equalizer equalizing the input signal. Then the sampling unit sampling the equalized input signal. the analyzing unit analyzing and statistical calculating the sampled and equalized digital image signal, generating a statistically calculation results, and adjusting parameters of the equalizer according to the statistical calculation results. Therefore, when determining whether the parameters of the equalizer occurs the predetermined effort, changing the adjusting of parameters of the equalizer in the direction.

22 Claims, 7 Drawing Sheets

DATA RECOVERY APPARATUS AND METHOD

BACKGROUND OF THE INVENTION

1. Field of the Invention

The present invention relates to a data recovery apparatus and method, and more particularly, to a data recovery apparatus and method used in a receiving device.

2. Description of the Prior Art

Generally speaking, be it a wired or wireless system, during transmission the quality of signals is always subject to influences of the transmission medium, temperature, or electromagnetic interferences, leading to signal amplitude attenuations or waveform distortions. In order for the receiving end to observe a signal transmitted via the transmission channel or medium, that is substantially the same as the signal transmitted at the transmitting end, the receiver of an electronic device usually features a data recovery circuit to recover the received signal. A typical data recovery circuit includes an equalizer for equalizing the received signal in order to impose different gain values upon the various frequency bands of the signal, and an over-sampling circuit for over-sampling the equalized signal. Because transmission channels/media vary according to surroundings, an adaptive equalizer is used to dynamically adjust its equalization process according to changes in transmission channels and media.

Considering an example where over-sampling with doubled sampling frequency is performed, please refer to FIGS. 1A to 1D of schematic diagrams showing how the adaptive equalizer adjusts its parameters. FIGS. 1A and 1B illustrate the sampling operation when the received and equalized signal transits from low level (0) to high level (1), while FIGS. 1C and 1D illustrate the sampling operation when the received and equalized signal transits from high level (1) to low level (0). In the example shown in FIGS. 1A and 1B, being under doubled sampling frequency, there are sampling points, such as the second and fourth sampling points, falling upon the center portion of the signal, while there are also sampling points, such as the third sampling point, falling at the edge of the signal. Those falling on the center portion of the signal are used for determining received data value, and those falling at the edge of the signal are used for determining whether the parameters of the equalizer are appropriately set or not. For example, in FIG. 1A the sampling point on the edge of the signal determines that the received signal is at the low level (0), indicating that the transition of the signal level is too slow, and an adjustment to the parameters of the equalizer is necessary so as to increase its high-frequency gain and therefore to make the transition of the signal at this sampling point take place earlier. Conversely, in FIG. 1B the sampling point on the edge of the signal determines that the received signal is at the high level (1), indicating that the transition of the signal is too fast, and the parameters of the equalizer should be adjusted so as to reduce the high-frequency gain and to have the transition of the signal at this sampling point take place later. In the case of transitions from the high to the low level shown in FIGS. 1C and 1D, similar observation can be made and the aforementioned parameter adjusting rule for the equalizer also applies.

Please refer to FIGS. 2A and 2B of schematic diagrams, similarly showing over-sampling of the equalized signal transiting from low level (0) to high level (1). The difference between FIGS. 2A and B and FIGS. 1A to 1D is that the initial configuration of the equalizer in FIG. 2A is with an overly strong high frequency gain. As the result, a bouncing 10' in FIG. 2A may occur at the region of signal transition. If such bouncing is so significant that the value sampled at the edge of the signal is likely to be determined as low level (0), as shown in FIG. 2A, applying the equalizer parameter adjustment algorithm as explained above, an even larger high-frequency gain would result, causing an even more significant bouncing phenomenon as shown in FIG. 2B. In this case, a positive feedback in an erroneous direction is formed, rendering the data recovery process impossible to properly operate.

SUMMARY OF THE INVENTION

It is therefore one objective of the present invention to provide a data recovery apparatus and method, which performs statistical calculation upon the sampled and equalized input signal, and adjusts the parameters of the equalizer based upon the result of the statistical calculation.

A data recovery apparatus according to the present invention applied to an image signal receiving device. The image signal receiving device include an interface, an equalizer, a sampling unit, and an analyzing unit. The method of the present invention includes steps of the interface unit receiving an input signal, and the equalizer equalizing the input signal. Then the sampling unit sampling the equalized input signal. the analyzing unit analyzing and statistically calculating the sampled and equalized digital image signal, generating a statistical calculation results, and adjusting parameters of the equalizer according to the statistical calculation results.

These and other objectives of the present invention will no doubt become obvious to those of ordinary skill in the art after reading the following detailed description of the preferred embodiment that is illustrated in the various figures and drawings.

DETAILED DESCRIPTION OF THE PREFERRED EMBODIMENT

It is to be noted that the data recovery apparatus and method as described in the present invention should function most effective when the data recovery is performed upon video signal received through those new generation digital high-speed serial interface, such as HDMI, HMDS, DisplayPort, or UDI, etc. However, a person of ordinary skill in the pertinent art should appreciate that the present invention is not limited to the application as listed above, and can be adopted into the data recovery processing in various receiving device.

Figure 3:
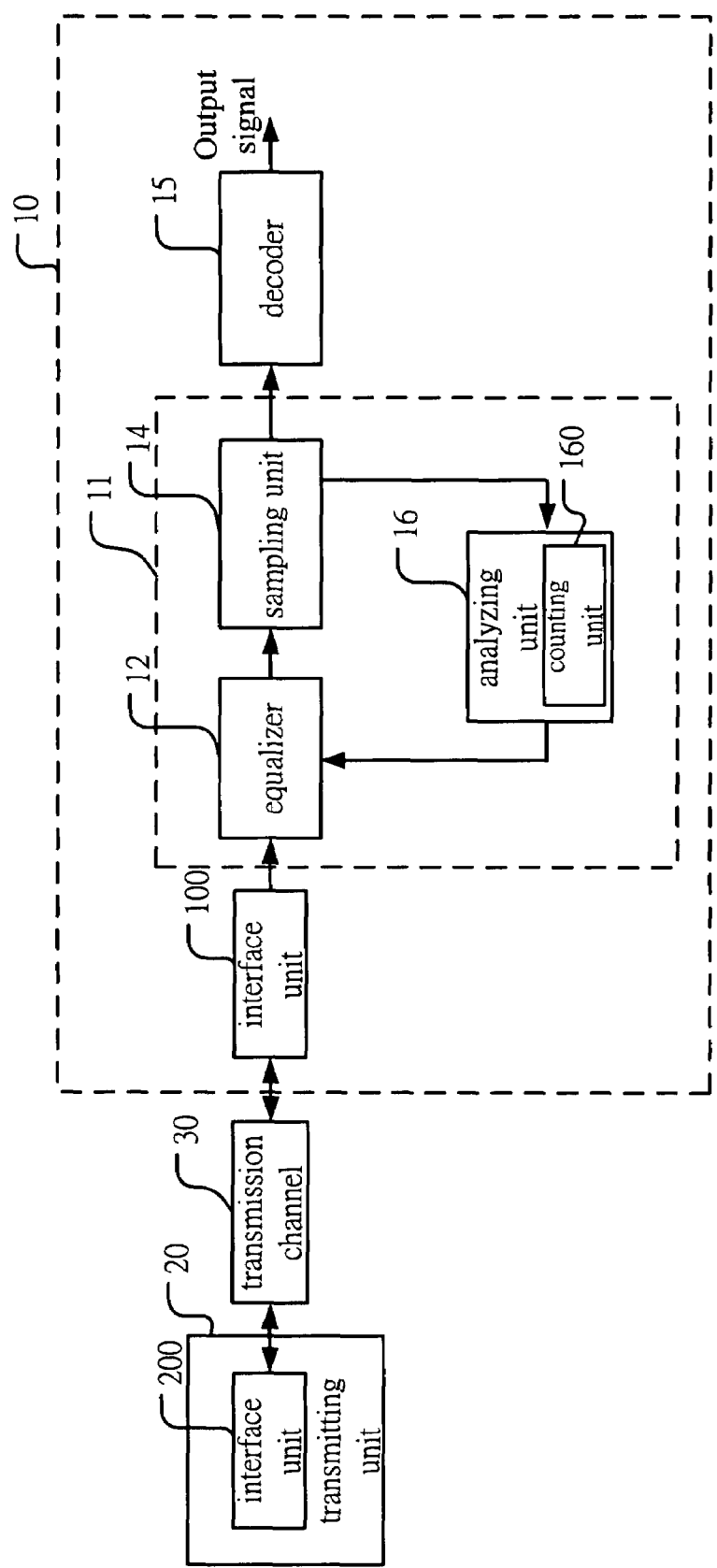
FIG. 3 is a block diagram showing a preferred embodiment according to the present invention.

Please refer to FIG. 3 of a block diagram showing the data recovery device according to an embodiment of the present invention. A receiving device 10 employs an interface unit 100 for interfacing with a transmitting device 20. The transmitting device 20 transmits its signals through an interface unit 200 and transmission channel 30 to the receiving device 10. In the present embodiment, the receiving device 10 is configured within a multi-media device such as, but not limited to, a digital TV. Said interface units 100, 200 could be configured conforming to one of those currently widely seen digital high-speed serial interface standards, such as HDMI, HMDS, DisplayPort, or UDI, and used for transmitting video signals required by the multi-media or AV devices.

After interface unit 100 receive a input signal, in order for recovering data, the receiving device 10 includes a data recovery device 11, which includes an equalizer 12, a sampling unit 14, and an analyzing unit 16. A decoder 15 further decodes the sampled signal from the sampling unit 14 in order to generate an output signal. A person of ordinary skill in the art should appreciate that, though not explicitly described herein, generally speaking the receiving device 10 also includes various other components, which are disposed in front of or after the data recovery device 11, serving various purposes. It is further to be noted that the current receiving device 10 is in a multi-media device and therefore the input signal is a digital video signal.

The equalizer 12 equalizes the received input signal, and then the sampling nit 14 samples the equalized input signal. The sampling unit 14 in the present embodiment is an over-sampling unit for over-sampling the equalized input signal on the doubled-frequency basis. The over-sampling unit could be capable of over-sampling the equalized input signal on higher frequency basis, and is thus not limited to this embodiment. The decoder 15 decodes the sampled and equalized input signal in order to generate the output signal.

Figure 2A:
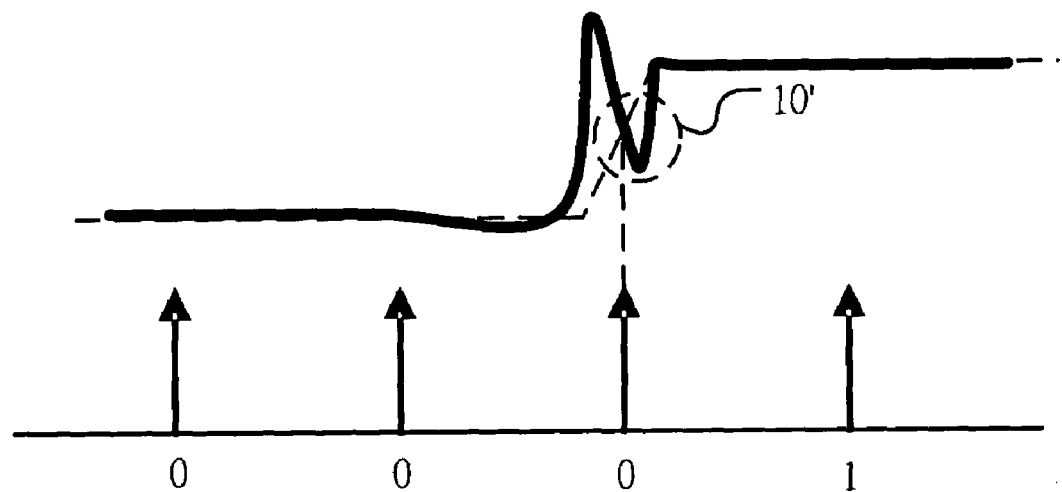
FIG. 2A is a schematic diagram showing a waveform with bouncing prior to equalization according to the conventional art.
Figure 2B:
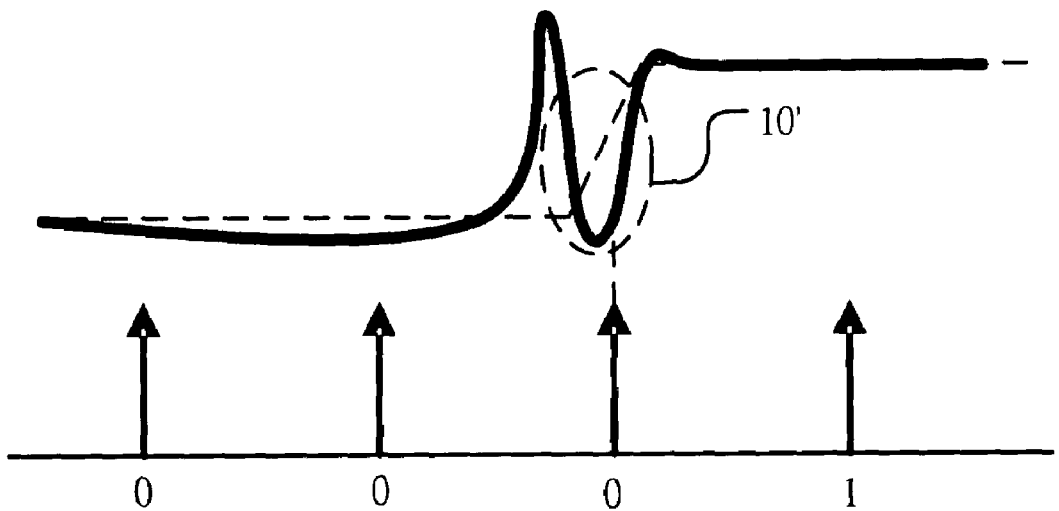
FIG. 2B is a schematic diagram showing a post-equalization waveform with bouncing according to the conventional art.

For the purpose of dynamically maintaining the parameters of the equalizer 12 at their optimal settings, so as to render the best result of the data recovery, the data recovery device 11 further includes the analyzing unit 16 for performing statistical calculation and analysis upon the sampled and equalized input signal, which in turn serves as the basis that the present invention data recovery device relies on in adjusting the parameters of the equalizer 12. A statistical analyzing algorithm such as disclosed in the present embodiment, can avoid the erroneous operation of wrong direction adjustment and positive feedback, resulting from the bouncing phenomenon due to certain parameter settings of the equalizer 12, as shown in FIGS. 2A and 2B. Because the input signal level tends to be affected by factors such as white noise and deviates away from actual value, in the present embodiment statistical calculation and analysis upon multiple sampling results is used for the purpose of determining signal level.

Figure 4:
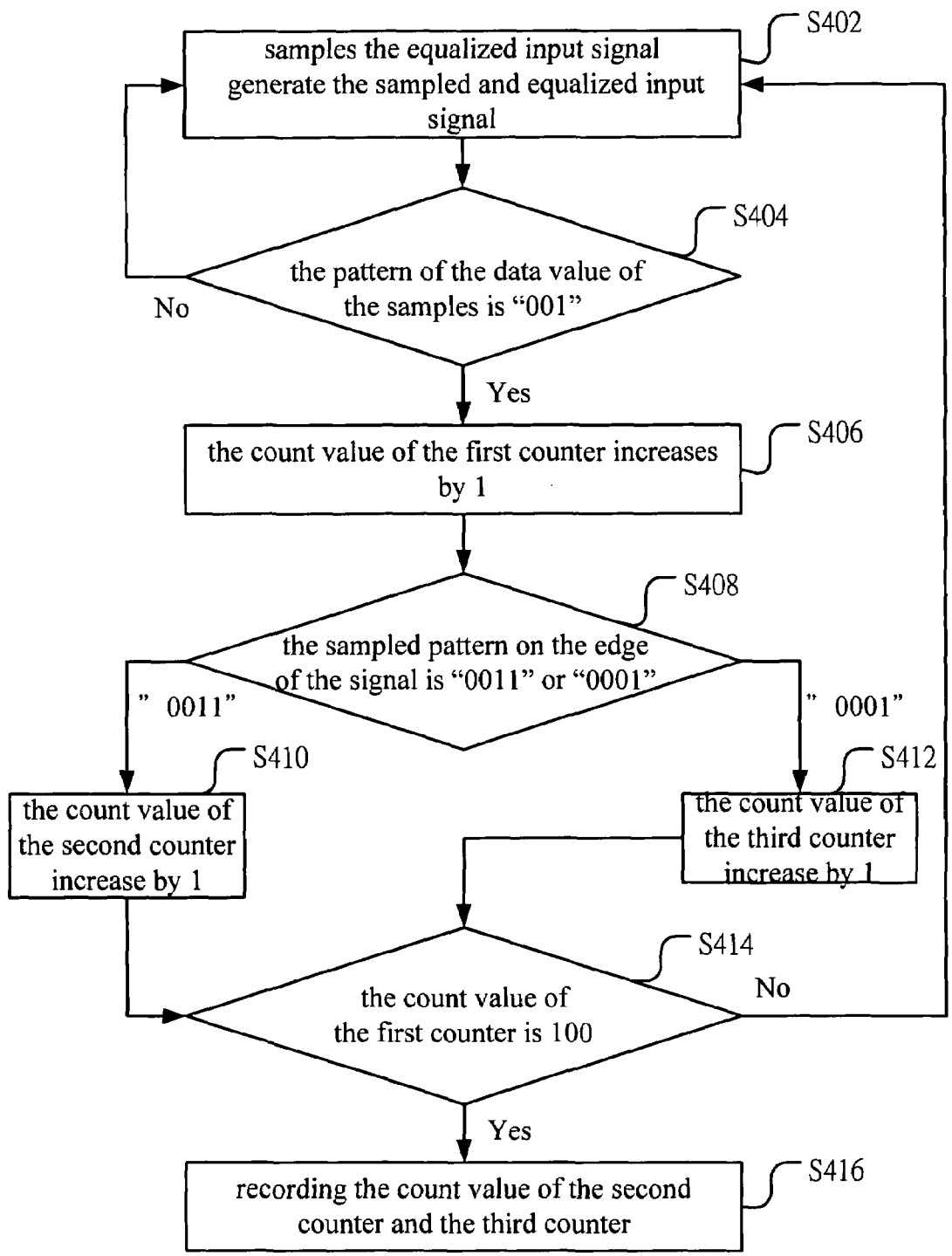
FIG. 4 is a flowchart showing the statistical calculation of the sampled and equalization input signal according to the present invention.

Please refer to FIG. 4 of a flow chart showing the statistical calculation of the sampled and equalized input signal performed by the analyzing unit 16 according to the present invention. Please note that, as an example, FIG. 4 merely illustrates the case of the transition of the sampled and equalized input signal from low to high level. At first, the sampling unit 14 samples the equalized input signal from the equalizer 12 to generate the sampled and equalized input signal (S402). Then, the analyzing unit 16 determines whether the pattern of the data value of the samples is "001" (S404); that is to make sure that the waveform of the signal ahead of sampling points, time-wise, has entered into a stable state. If not, the sampling continues until the pattern of "001" appears; if so, the count value of the first counter CNT1 increases by 1 (S406). Then the analyzing unit 16 determines whether the sampled pattern on the edge of the signal is "0011" or "0001" while the current data pattern of the signal is "001" (S408). If the sampled pattern on the edge is "0011", the count value of the second counter CNT2 increases by 1 (S410); if the sampled pattern on the edge is "0001", the count value of the third counter CNT3 increases by 1. Before the count value of the first counter CNT1 reaches a predetermined value (such as 100), steps S402 to S412 are repetitively performed (S414). Once the count value of the first counter CNT1 reaches to that predetermined value, the count values of the second and third counters CNT2 and CNT3 are recorded (S416). Additionally, the analyzing unit 16 further includes a counting unit 160 for counting the first, second, and third counters CNT1, CNT2, and CNT3. It is to be noted that since under normal circumstances, the count value of the first counter CNT1 equals the sum of the count value of the second and third counters CNT2 and CNT3, the counting and recording of only one of the second and third counters CNT2 and CNT3 proves sufficient for the purpose of enabling the present embodiment.

Figure 5:
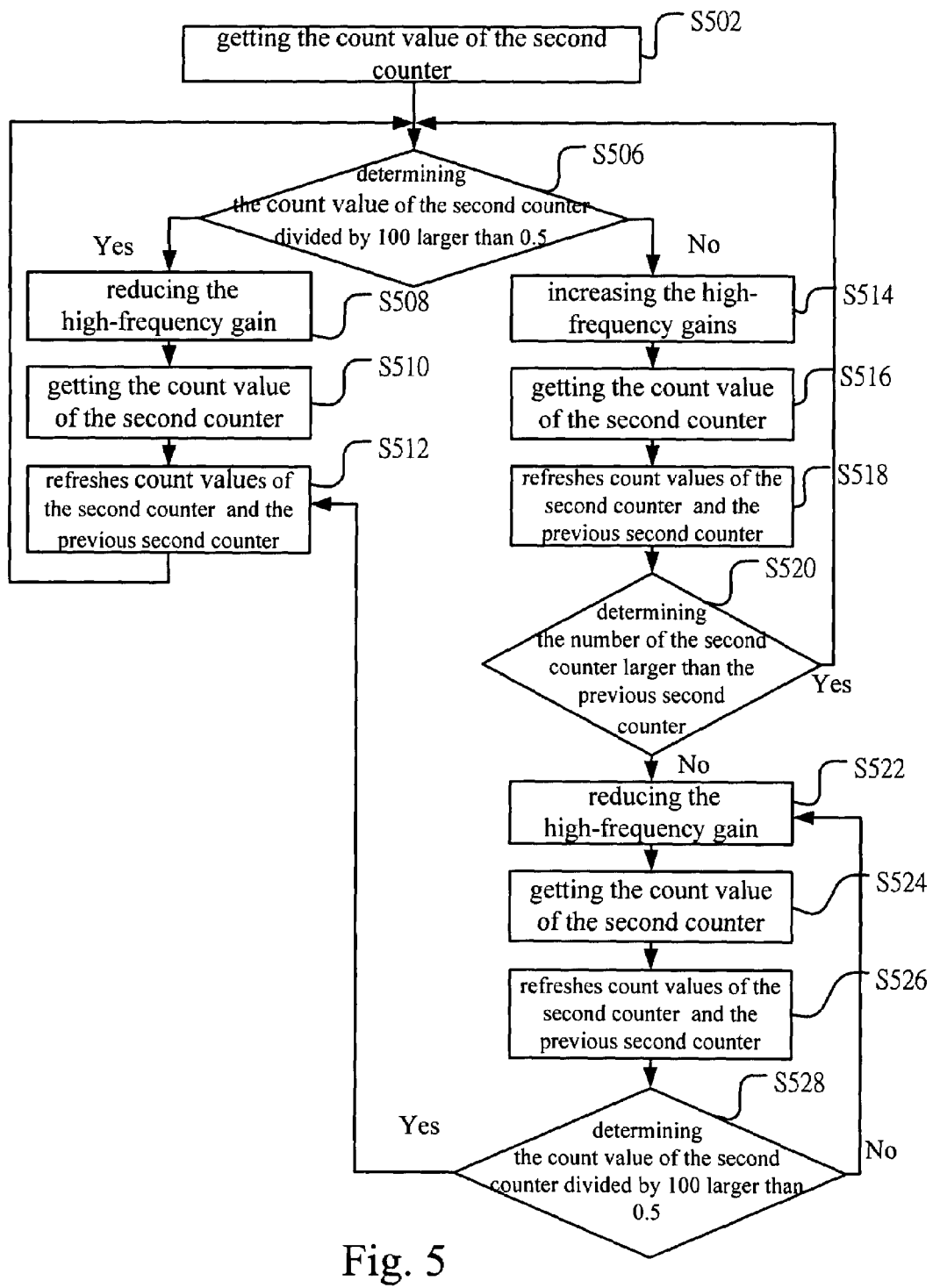
FIG. 5 is a flowchart showing another preferred embodiment according to the present invention.

Please refer to FIG. 5 of a flow chart showing adjustment of the equalizer parameters based on the above-described statistical calculations by the analyzing unit 16, according to an embodiment of the present invention. The analyzing unit 16 divides the number of the second counter CNT2 by 100 and then determines whether the transition on the edge of the signal takes place too early or too late according to the result of the division being larger or smaller than 0.5 (ignoring the few instances where the result of the division equals to 0.5); in other words, whether the probability of sampled value at the edge of transition equal to one (i.e., occurrence of sampled pattern "0011"), among 100 such instances, is larger or smaller than 50 percent, is referred to when determining whether the transition at the edge occurs too early or too late. The analyzing unit 16 further records statistical calculation results before and after equalizer parameter adjustment, to determine if there is any positive feedback of wrong direction, as shown in FIGS. 2A and 2B. If there is such positive feedback, the analyzing unit 16 readjusts equalizer parameters accordingly to avoid further undesirable positive feedback from happening.

At first, the analyzing unit 16 performs steps in FIG. 4 to obtain the count value of the second counter CNT2 (S502) and then divides that count value of the second counter CNT2 by 100. The count value of the second counter CNT2 divided by 100 being larger or smaller than 0.5, which is indicative of the probability of sampled value equal to 1 at the edge (i.e., occurrence of sampled pattern "0011"), among 100 such instances, being larger or smaller than 50 percent, is used to determine whether the transition at the edge takes place too early or too late (S506). If S506 determines that the count value of the second counter CNT2 divided by 100 is larger than 0.5, the transition at the edge of the signal takes place too early, as shown in FIG. 1B, and parameters of the equalizer 12 should be adjusted to reduce the high-frequency gain, in order to delay the occurrence of the transition at the edge of the signal (S508). Thereafter, the analyzing unit 16 again performs statistical calculation, refreshes the count values of the second counter and the previous second counter CNT2 and CNT2' (S510 and S512), and repeats the step S506. Here it is to be noted that the operation of refreshing the count values of the second counter and the previous second counter CNT2 and CNT2' is performed by updating the current statistical calculation result into the count value of the second counter CNT2, and updating the previous statistical calculation result (that is, the value previously stored in CNT2) into the previous second count value CNT2'.

Figure 1A:
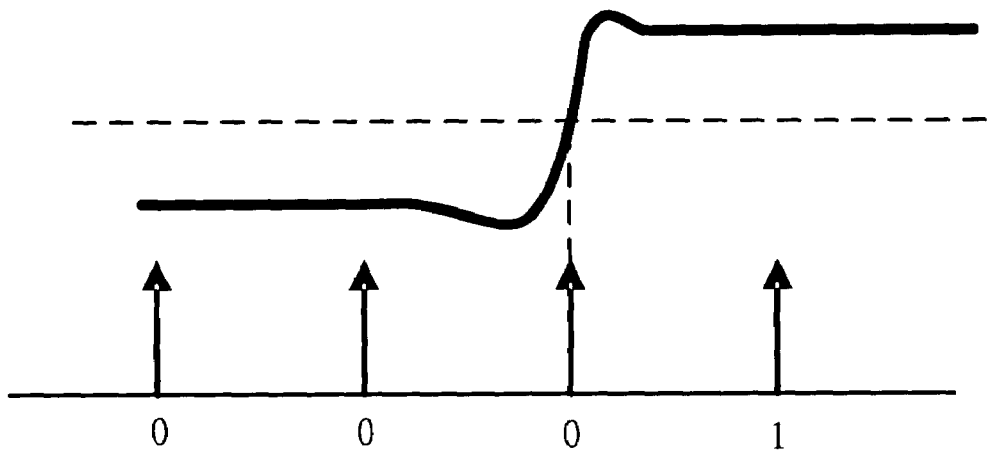
FIG. 1A is a schematic diagram showing a waveform prior to the equalization according to the conventional art.
Figure 1B:
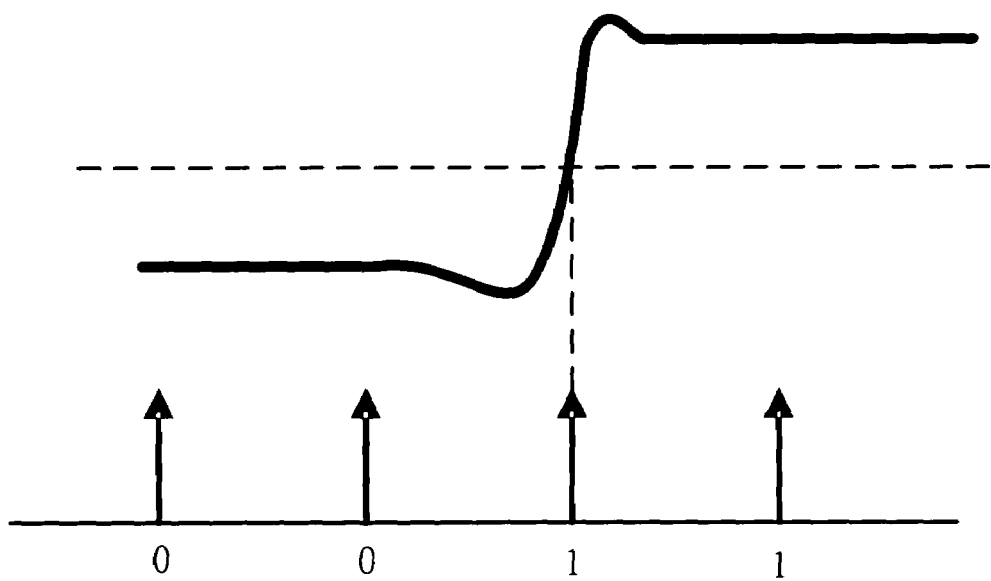
FIG. 1B is another schematic diagram showing a waveform prior to the equalization according to the conventional art.
Figure 1C:
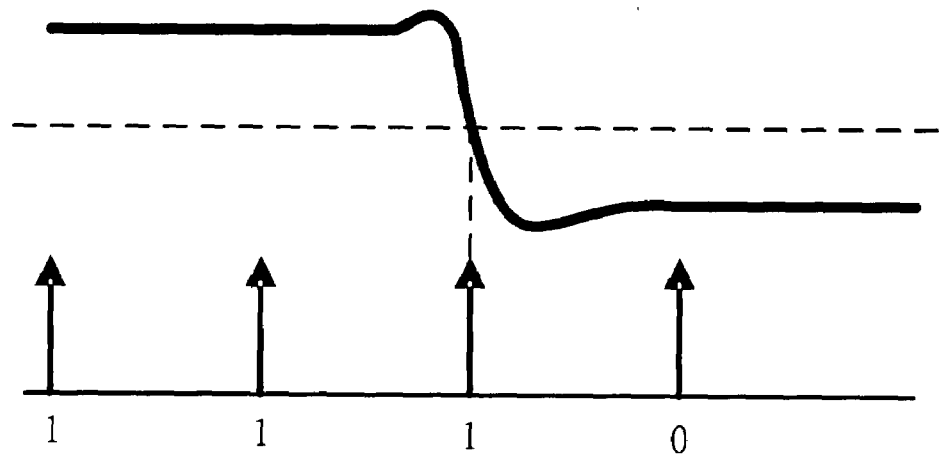
FIG. 1C is a schematic diagram showing a post-equalization waveform according to the conventional art.
Figure 1D:
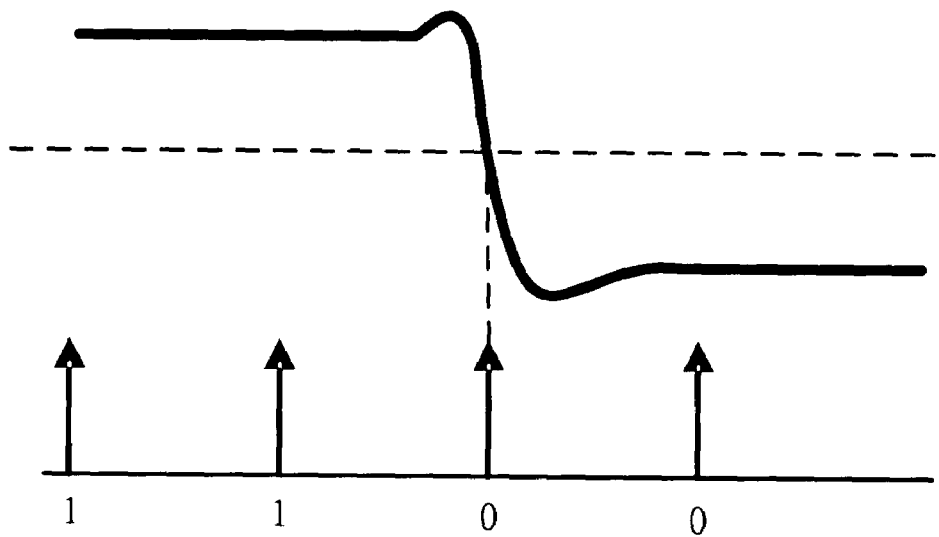
FIG. 1D is another schematic diagram showing a post-equalization waveform according to the conventional art.

The count value of the second counter divided by 100 being less than 0.5 indicates that the occurrence of the transition at edge of the signal takes place too late, as shown in FIG. 1A. As the result, equalizer parameters should be adjusted to increase high-frequency gains, so as to accelerate the transitions at the edge of the signal (S514). Afterwards, the analyzing unit 16 recalculates and refreshes the updated count value of the second counter CNT2 and the previous count value of the second counter CNT2' (S516 and S518). To determine whether the equalizer 12 operates properly at the current sampling point as shown in FIGS. 1A and 1B, or has already been in the erroneous positive feedback situations as shown in FIGS. 2A and 2B, the analyzing unit 16 compares the current count value of the second counter CNT2 and the previous count value of the second counter CNT2' (S520). If CNT2 is larger than CNT2', the frequency of occurrence of the sampled pattern "0011" picks up as expected and the equalizer 12 operates properly as shown in FIGS. 1A and 1B, after having the high-frequency gain of the equalizer 12 increased. Afterwards, the step S506 will be repeated.

However, if S520 determines that CNT2 is less than CNT2', the frequency of occurrence of the sampled pattern "0011" goes down instead of picking up as expected even after having the high-frequency gain of the equalizer increased, and this indicates that the previous high-frequency gain has already been too high and erroneous positive feedbacks have been taking place as shown in FIGS. 2A and 2B. As a result, the equalizer parameters should not be adjusted in the previous erroneous direction; rather, they should be adjusted in the opposite direction. In other words, the high-frequency gains should be reduced (S522) rather than increased so as to effectively place the sampling point at the proper location of the input signal. Thereafter, the analyzing unit 16 recalculates and refreshes the current and previous count values of the second counter CNT2 and CNT2' (S524 and S526), and determines whether the updated count value of the second counter CNT2 divided by 100 is larger or smaller than 0.5 (S528). If CNT2 divided by 100 is smaller than 0.5, steps of S522 to S528 will be repeated. Steps of S506 to S520 will only be repeated when the count value of the second counter CNT2 divided by 100 becomes larger than 0.5.

Though the data recovery device 11 in the preferred embodiment in FIG. 3 adopts as a criterion of whether the current pattern of the data value of the input signal is "001" in determining whether to include the current sampling point into the statistical calculation of the analyzing unit 16, the present invention is not limited thereto. Furthermore, although when to conclude one round of statistical calculation of the present embodiment hinges on whether CNT1 reaches a predetermined value of 100, the present invention is not limited thereto. In other preferred embodiments, the counting unit 160 can also be implemented to maintain only two count values such as the count value of the second and third counters CNT2 and CNT3, and the conclusion of a round of statistical calculation depends on whether either one of the count value of the second and third counters CNT2 and CNT3 reaches a predetermined value. However, in this case the frequency of occurrence of the sampled patterns "0011" and "0001" should be based on CNT2 divided by the sum of CNT2 and CNT3, and CNT3 divided by the sum of CNT2 and CNT3, respectively. Consequently, the threshold ratio (such as CNT2/100 in FIG. 5) to determine whether another adjustment to the equalizer parameters is required changes accordingly.

Furthermore, it is to be noted that the embodiment in FIG. 5 is only one of many implementations of the present invention. A person of ordinary skill in the art should readily observe that any alteration or modification to those embodiments as herein disclosed, which conforms to the spirit of the invention: that is, determining whether the equalizer parameter adjustment results in expected effect, and when not as expected, changing the direction of the equalizer parameter adjustment, to prevent positive feedback of wrong direction from occurring, still falls within the scope of protection of the present invention.

Although above embodiments of the invention only disclose the sampling statistics from low level to high level, it should be understood that using the sampling statistics from high level to low level as reference of equalizer parameter adjustment is no more than well-known alteration or modification that is within the knowledge of a person of ordinary skill in the art, and still falls in the scope of protection of the present invention.

Figure 6:
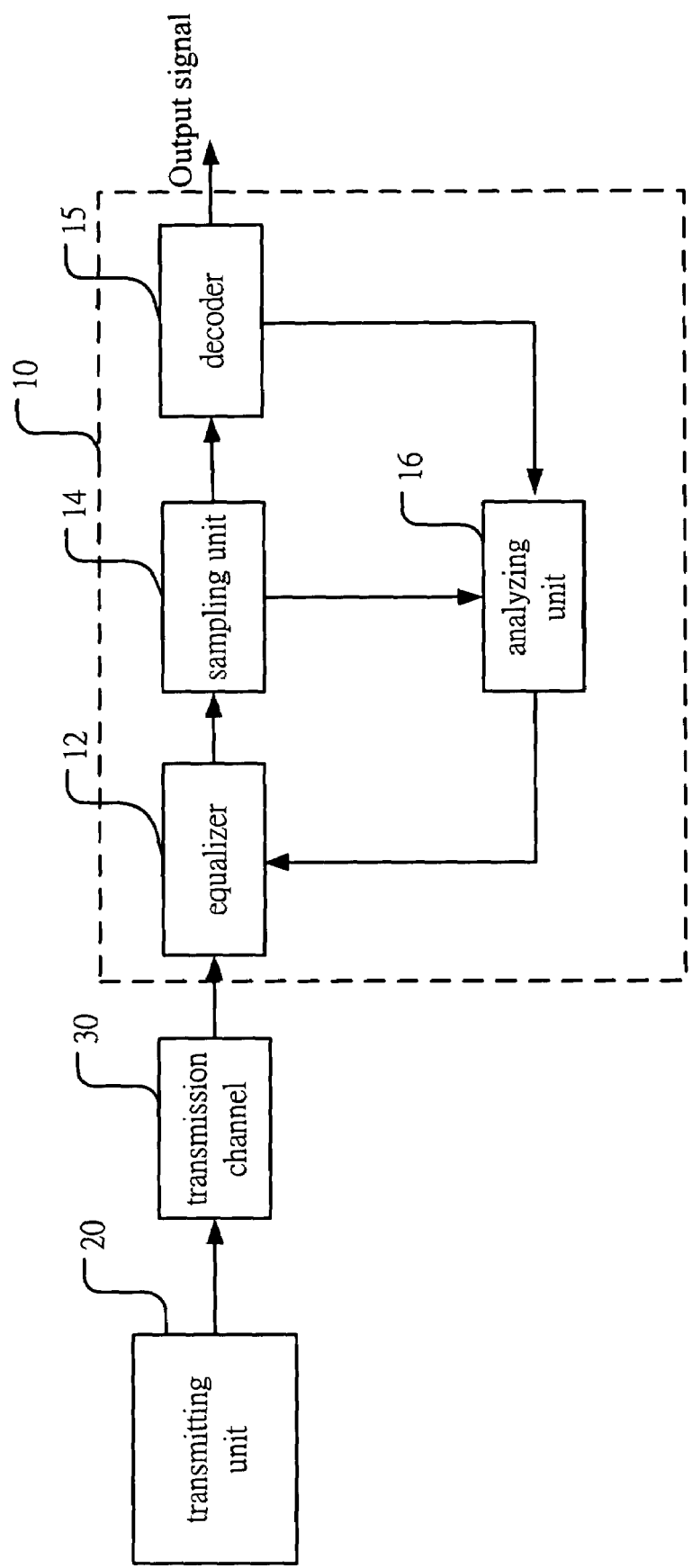
FIG. 6 is a block diagram showing yet another preferred embodiment according to the present invention.

Please refer to FIG. 6 of a block diagram showing another preferred embodiment according to the present invention. The components of the receiving device 10 in FIG. 6 are basically the same as those of the receiving device 10 in FIG. 3. What is different is that in FIG. 6, when performing adjustment of the equalizer parameters, in addition to referencing the sampling statistics of the sampling unit 14, the analyzing unit 16 further references to a signal quality parameter generated by a later-stage decoder 15, such as BCH (Bose-Chaudhuri-Hocquenghem) error detecting result, or bit error rate, and takes into account this signal quality parameter in determining whether positive feedback of wrong direction has occurred.

In contrast to the prior art. The present invention data recovery data device and method readjusts the equalizer parameters in the direction opposite to the previous adjusting direction so long as the previous adjustment to parameters is not as expected in order to ensure there is no occurrence of the erroneous positive feedbacks.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A data recovery apparatus applied to an image signal receiving device, the image signal receiving device comprising:
    an interface unit receiving a digital image signal;
    an equalizer equalizing the digital image signal from the interface unit;
    a sampling unit sampling the equalized digital image signal; and
    an analyzing unit statistically calculating the sampled and equalized digital image signal, generating a first statistical calculation result, and adjusting parameters of the equalizer according to the first statistical calculation result.

2. The data recovery apparatus in claim 1 wherein when the first statistical calculation result and a second statistical calculation result of the sampled and equalized digital image signal indicate that the analyzing unit adjusts the parameters of the equalizer in a wrong direction, the analyzing unit re-adjusts the parameters of the equalizer in another direction.

3. The data recovery apparatus in claim 1 wherein the analyzing unit adjusts the parameters of the equalizer in a first adjusting direction when the first statistical calculation result falls at a first side of a predetermined threshold ratio.

4. The data recovery apparatus in claim 3 wherein the predetermined threshold ratio is 50 percent.

5. The data recovery apparatus in claim 3 wherein after the analyzing unit adjusts the parameters of the equalizer in the first adjusting direction, the analyzing unit re-adjusts the parameters of the equalizer in a second adjusting direction when a second statistical calculation result of the sampled and equalized digital image signal falls at the same side of the predetermined threshold ratio as the first statistical calculation result but is farther away from the predetermined threshold ratio than the first statistical calculation result.

6. The data recovery apparatus in claim 1 wherein the analyzing unit includes a counting unit counting the number of occurrence of a predetermined sampled pattern shown in the sampled and equalized digital image signal.

7. The data recovery apparatus in claim 6 wherein the predetermined sampled pattern is at a signal level transition.

8. The data recovery apparatus in claim 1 wherein the image signal receiving unit further includes a decoder decoding the sampled and equalized digital image signal in order to generate a signal quality parameter, the analyzing unit adjusts the parameters of the equalizer according to the signal quality parameter.

9. A data recovery apparatus in a receiving device, comprising:
an interface unit receiving an input signal;
an equalizer, equalizing the input signal received by the interface unit;
an over-sampling unit, sampling the equalized input signal; and
an analyzing unit, statistically calculating the over-sampled and equalized input signal, and then adjusting parameters of the equalizer according to the result of the statistical calculation in a first adjusting direction;
wherein when the analyzing unit erroneously adjusts the parameters of the equalizer in the first direction, the analyzing unit re-adjusts the parameters of the equalizer in a second adjusting direction.

10. The data recovery apparatus in claim 9 wherein the analyzing unit adjusts the parameters of the equalizer in a first adjusting direction when a first statistical calculation result of the over-sampled and equalized input signal falls at a first side of a predetermined threshold ratio.

11. The data recovery apparatus in claim 10 wherein the predetermined threshold ratio is 50 percent.

12. The data recovery apparatus in claim 10 wherein after the analyzing unit adjusts the parameters of the equalizer in the first adjusting direction, the analyzing unit re-adjusts the parameters of the equalizer in a second adjusting direction when a second statistical calculation result of the over-sampled and equalized input signal falls at the same side of the predetermined threshold ratio as the first statistical calculation result but is farther away from the predetermined threshold ratio than the first statistical calculation result.

13. The data recovery apparatus in claim 9 wherein the analyzing unit further includes a counting unit counting the number of occurrence of a predetermined sampled pattern shown in the over-sampled and equalized input signal.

14. The data recovery apparatus in claim 13 wherein the predetermined sampled pattern is at a signal level transition.

15. The data recovery apparatus in claim 9 further includes a decoder for decoding the over-sampled and equalized input signal in order to generate a signal quality parameter, analyzing unit adjusts the parameters of the equalizer according to the signal quality parameter.

16. A data recovery method, comprising:
receiving an input signal;
equalizing the input signal;
sampling the equalized input signal;
statistically calculating the sampled and equalized input signal for a first time;
adjusting parameters for equalizing in a first adjusting direction according to the result of the first time statistical calculation;
statistically calculating the sampled and equalized input signal for a second time after adjusting the parameters;
comparing the results of the first time statistical calculation and the second time statistical calculation; and
adjusting the parameters in a second adjusting direction according to the comparison of the results of the first time statistical calculation and the second time statistical calculation.

17. The data recovery method in claim 16 wherein the adjusting of the parameters for equalizing in the first adjusting direction is performed when the result of the first time statistical calculation falls at a first side of a predetermined threshold ratio.

18. The data recovery method in claim 17 wherein the predetermined threshold ratio is 50 percent.

19. The data recovery method in claim 16 wherein the adjusting of the parameters in the second adjusting direction after comparing the results of the first time statistical calculation and the second time statistical recalculation is performed when the result of the second time statistical calculation falls at the same side of the predetermined threshold ratio as the result of the first time statistical calculation but is farther away from the predetermined threshold ratio than the result of the first time statistical calculation.

20. The data recovery method in claim 16 wherein the steps of the statistically calculating the sampled and equalized input signal is implemented by calculating the number of occurrence of a predetermined sampled pattern shown in the sampled and equalized input signal.

21. The data recovery method in claim 20 wherein the predetermined sampled pattern is at a signal level transition.

22. The data recovery method in claim 16 further includes decoding the sampled and equalized input signal so as to generate a signal quality parameter and then adjusting the parameters according to signal quality parameter.

* * * * *